(12) United States Patent
Nishikawa et al.

(10) Patent No.: US 9,915,849 B2
(45) Date of Patent: Mar. 13, 2018

(54) OPTICAL MODULATOR

(71) Applicant: Mitsubishi Electric Corporation, Chiyoda-ku (JP)

(72) Inventors: Satoshi Nishikawa, Tokyo (JP); Toshiyuki Tanaka, Tokyo (JP); Koichi Akiyama, Tokyo (JP); Eiji Yagyu, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/402,633

(22) Filed: Jan. 10, 2017

(65) Prior Publication Data

US 2017/0227828 A1      Aug. 10, 2017

(30) Foreign Application Priority Data

Feb. 8, 2016  (JP) .................................. 2016-021702
Dec. 1, 2016  (JP) .................................. 2016-233801

(51) Int. Cl.
  *G02F 1/225*   (2006.01)
  *G02F 1/017*   (2006.01)
  *G02F 1/21*    (2006.01)

(52) U.S. Cl.
  CPC ........ *G02F 1/2255* (2013.01); *G02F 1/01708* (2013.01); *G02F 1/2257* (2013.01); *G02F 2001/212* (2013.01)

(58) Field of Classification Search
  CPC ...... G02F 1/2255; G02F 1/025; G02F 1/2257; G02F 1/0121; G02F 1/01708; G02F 1/225

USPC .......................................................... 385/1–10
See application file for complete search history.

(56) References Cited

U.S. PATENT DOCUMENTS

2015/0293384 A1* 10/2015 Ogawa .................... G02F 1/025
                                                              385/2

FOREIGN PATENT DOCUMENTS

JP          2014-178480          9/2014

* cited by examiner

*Primary Examiner* — Akm Enayet Ullah
*Assistant Examiner* — Michael Mooney
(74) *Attorney, Agent, or Firm* — Oblon, McClelland, Maier & Neustadt, L.L.P.

(57) ABSTRACT

Provided is a technique for reducing, using a simple circuit configuration, an amplitude difference between electric signals that are input to respective optical waveguide arms. An optical modulator includes: an optical demultiplexer that splits continuous wave light as received; first and second optical waveguide arms through which the continuous wave light as split propagates; an optical phase π shifter that introduces a phase shift of π to the continuous wave light as split; an optical multiplexer combines the continuous wave light propagating through the first and second optical waveguide arms; first and second signal electrodes that respectively input the electric signals to the first and second optical waveguide arms; a junction capacitance connected in shunt to at least one of the first and second signal electrodes; and a DC voltage source that applies a DC voltage to the junction capacitance.

16 Claims, 10 Drawing Sheets

F I G. 1 1
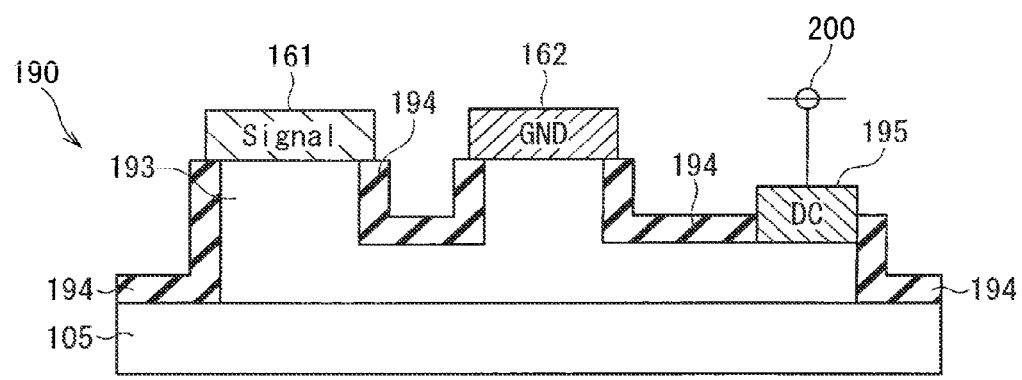
F I G. 1 2
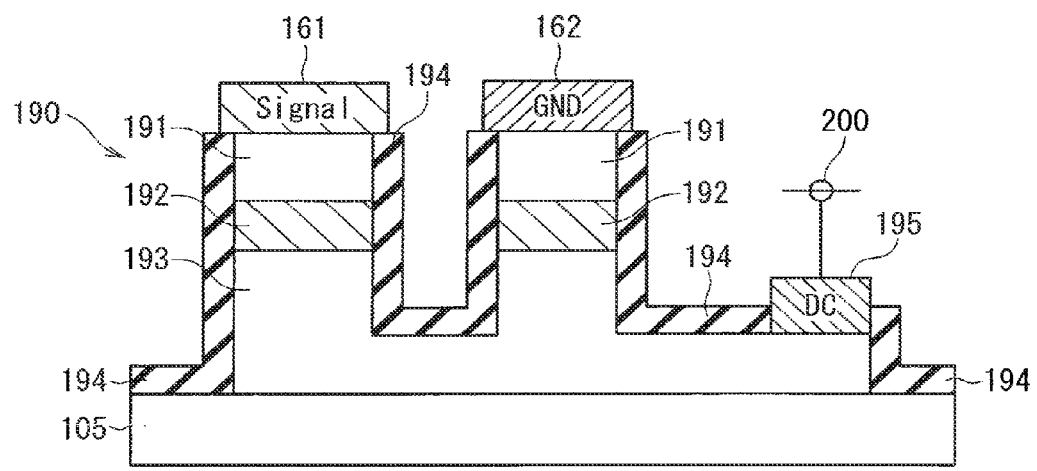

OPTICAL MODULATOR

BACKGROUND OF THE INVENTION

Field of the Invention

The present invention relates to techniques for controlling optical modulators, and more particularly, to a technique applicable to a Mach-Zehnder optical modulator.

Description of the Background Art

Optical communication systems have been growing in capacity in response to an abrupt increase in volume of data communication. Semiconductor lasers, which have been widely used as key devices of the optical communication systems, modulate phases or intensities in accordance with transmission distances of optical signals. Small devices are required in optical transmission systems for a middle-and-short distance of 100 km or less, such as metro networks (intra-city communications), and fiber-to-the-home (FTTH) networks. Accordingly, intensity-modulation lasers are widely used. Meanwhile, phase-modulation lasers, which enable both high-speed operation and long-distance transmission, are now widely used in optical transmission systems for a long distance of 100 km or more, such as core networks (inter-city communications).

An example of widely-used phase-modulation lasers is a Mach-Zehnder modulator (hereinafter referred to as MZM). A phase-modulation MZM converts an electric digital signal into an optical digital signal. The phase-modulation MZM varies a refractive index of a multi-quantum well using an electric signal to thus phase-modulate an output of continuous wave (CW) light from a semiconductor laser.

One way to achieve good optical characteristics in the MZM is to reduce an amplitude difference between electric signals that are input to two optical waveguide arms after Y-branching. This is because a large amplitude-difference lowers an optical output, drops an extinction ratio, and intensifies noise. Additionally, a small phase-shift between the electric signals, which are input to the respective optical waveguide arms, reduces signal determination errors after the transmission of the signals.

However, different optical waveguide arms have different electrode patterns before the electric signals enter the optical waveguide arms from input ends of signal electrodes, due to a limited chip-layout of an element. Unfortunately, this causes different wave optical waveguides to have different amplitudes and phases of the electric signals, which are input to the optical waveguide arms.

Adjusting an electrical length in a module substrate on which an MZM element is disposed readily reduces a phase shift between the electric signals. On the other hand, it is difficult to regulate the amplitude difference between the electric signals in response to a change in pattern of the module substrate. This is because low-loss module substrates are widely used for less loss of the electric signals. Accordingly, a well-structured element is necessary for a small amplitude difference between the electric signals in the MZM element.

An exemplary technique for reducing the amplitude difference is described in Japanese Patent Application Laid-Open No. 2014-178480 that provides an input signal adjustment region and adjusts amplitudes of electric signals that are input to two respective optical waveguide arms for equalization.

However, Japanese Patent Application Laid-Open No. 2014-178480 fails to disclose both specific structure of the input signal adjustment region and specific method of the adjustment.

SUMMARY OF THE INVENTION

It is an object of the present invention to provide a technique for reducing, using a simple circuit configuration, an amplitude difference between electric signals that are input to respective optical waveguide arms.

The optical modulator according to an aspect of the present invention varies refractive indexes of multi-quantum wells of first and second optical waveguide arms using electric signals so as to phase-modulate continuous wave light received from a semiconductor laser. The optical modulator is a Mach-Zehnder modulator. The optical modulator includes an optical demultiplexer, the first and second optical waveguide arms, an optical phase shifter, an optical multiplexer, first and second signal electrodes, a junction capacitance, and a DC voltage source. The optical demultiplexer splits the continuous wave light as received. Through the first and second optical waveguide arms, the continuous wave light as split propagates. The optical phase shifter is disposed on at least one of the first and second optical waveguide arms, and the optical shifter introduces a phase shift of $\pi$ to the continuous wave light as split. The optical multiplexer is disposed in rear stages of the first and second optical waveguide arms, and the optical multiplexer combines the continuous wave light propagating through the first and second optical waveguide arms. The first and second signal electrodes respectively input the electric signals to the first and second optical waveguide arms. The junction capacitance is connected in shunt to at least one of the first and second signal electrodes. The DC voltage source applies a DC voltage to the junction capacitance.

The optical modulator is configured such that the DC voltage source applies the DC voltage to the junction capacitance to regulate a value of the junction capacitance so as to regulate an amplitude value of the electric signal that is input to at least one of the first optical waveguide arm and the second optical waveguide arm. This enables, using a simple circuit configuration, an amplitude difference between the electric signals, which are input to the respective first and second optical waveguide arms, to be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a cross-sectional view of another configuration of the junction capacitance;

FIG. 12 is a cross-sectional view of still another configuration of the junction capacitance;

DESCRIPTION OF THE PREFERRED EMBODIMENTS

First Preferred Embodiment

Figure 1:
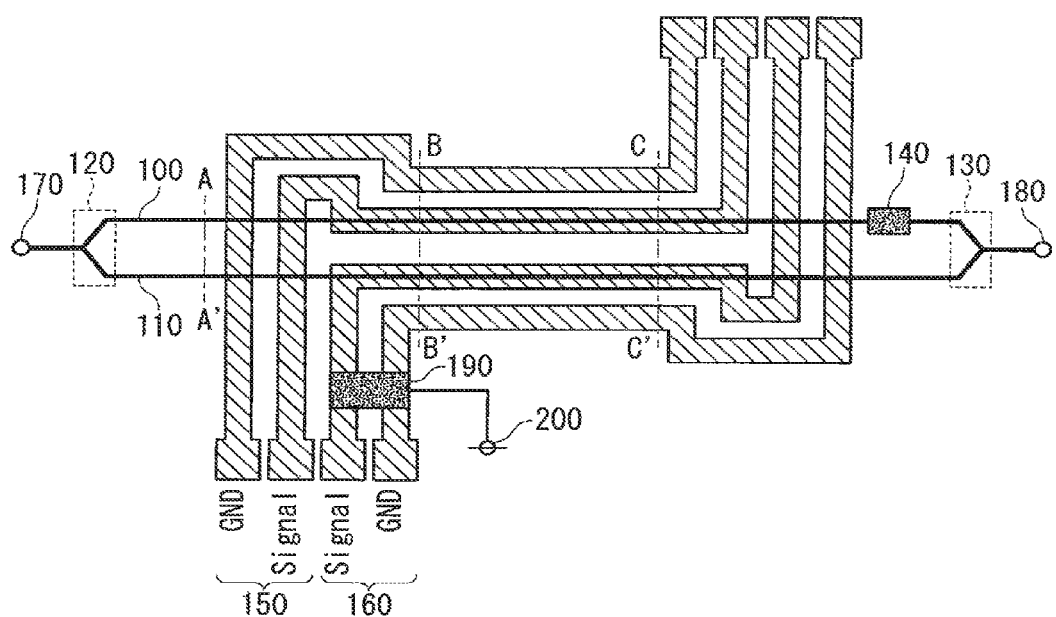
FIG. 1 is a diagram of a configuration of an optical modulator according to a first preferred embodiment.

The following describes a first preferred embodiment with reference to the drawings. FIG. 1 is a diagram of a configuration of an optical modulator according to the first preferred embodiment.

As illustrated in FIG. 1, the optical modulator according to the first preferred embodiment is a Mach-Zehnder modulator (MZM). The optical modulator includes an incoming terminal 170, an optical demultiplexer 120, an optical waveguide arm 100, an optical waveguide arm 110, an optical phase π shifter 140, an optical multiplexer 130, an outgoing terminal 180, a signal electrode 150, a signal electrode 160, a junction capacitance 190, and a DC voltage source 200.

The incoming terminal 170 receives continuous wave light from a semiconductor laser. The optical demultiplexer 120 splits the continuous wave light, which is received from the semiconductor laser. The continuous wave light that is split by the optical demultiplexer 120 propagates through the optical waveguide arm 100 and the optical waveguide arm 110. The optical phase π shifter 140 (optical phase shifter) is disposed at a termination side on the optical waveguide arm 100 (second optical waveguide arm), and introduces a phase shift of π to the continuous wave light as split to thus π-reverse a phase of the continuous wave light. The optical multiplexer 130 is disposed in rear stages of the optical waveguide arm 100 and the optical waveguide arm 110, and more specifically, in a rear stage of the optical phase π shifter 140. The optical multiplexer 130 combines the continuous wave light propagating through the optical waveguide arm 100 and the optical waveguide arm 110 (first optical waveguide arm). Through the outgoing terminal 180, the continuous wave light that is combined by the optical multiplexer 130 is emitted.

The signal electrode 150 (second signal electrode) and the signal electrode 160 (first signal electrode) respectively input electric signals to the optical waveguide arm 100 and the optical waveguide arm 110. The junction capacitance 190 is connected in shunt to the signal electrode 160. The DC voltage source 200 applies a DC voltage to the junction capacitance 190 to regulate a value of the junction capacitance 190. In some embodiments, the optical phase π shifter 140 is disposed at a termination side of the optical waveguide arm 110 instead of the termination side of the waveguide arm 100.

The following describes an operation of the optical modulator according to the first preferred embodiment. The optical modulator varies refractive indexes of multi-quantum wells of the optical waveguide arm 100 and the optical waveguide arm 110 to thus phase-modulate the continuous wave light received from the semiconductor laser using the electric signals.

Figure 2:
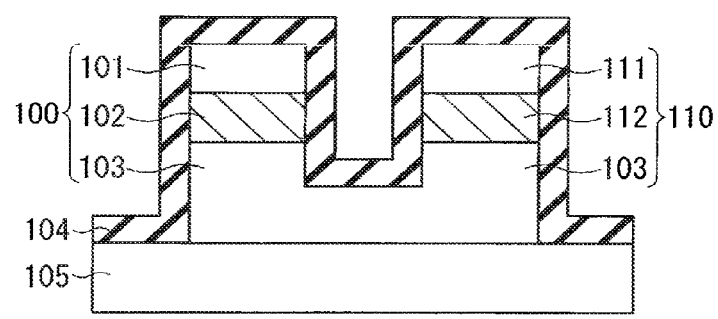
FIG. 2 is a cross-sectional view taken along line A-A' in FIG. 1.

The following details the operation of the optical modulator. The continuous wave light from the semiconductor laser, received by the incoming terminal 170 is split into two light waves by the optical demultiplexer 120 in the same phase. The split two light waves then propagate through the respective optical waveguide arm 100 and optical waveguide arm 110. FIG. 2 is a cross-sectional view taken along line A-A' in FIG. 1; that is, FIG. 2 is a cross-sectional view of a structure in end surface A-A'. As illustrated in FIG. 2, an n-semiconductor layer 103, an active layer 102, and a p-semiconductor layer 101 are stacked on a semi-insulating substrate 105 in this order. An insulating film 104 is disposed over the stack of these layers. The optical waveguide arm 100 has a three-layer structure including the p-semiconductor layer 101, the active layer 102, and the n-semiconductor layer 103. The optical waveguide arm 110 has a three-layer structure of a p-semiconductor layer 111, an active layer 112, and the n-semiconductor layer 103. The continuous wave light propagating through the optical waveguide arm 100 propagates through the active layer 102, while the continuous light propagating through the optical waveguide arm 110 propagates through the active layer 112.

The signal electrode 150 and the signal electrode 160 each receive a differential electric signal. The differential electric signals are terminated at the same resistance value as characteristic impedances of the signal electrode 150 and the signal electrode 160. The signal electrode 150 includes a signal (Signal) electrode 151 and a ground (GND) electrode 152. The signal electrode 160 includes a signal (Signal) electrode 161 and a ground (GND) electrode 162.

Figure 3:
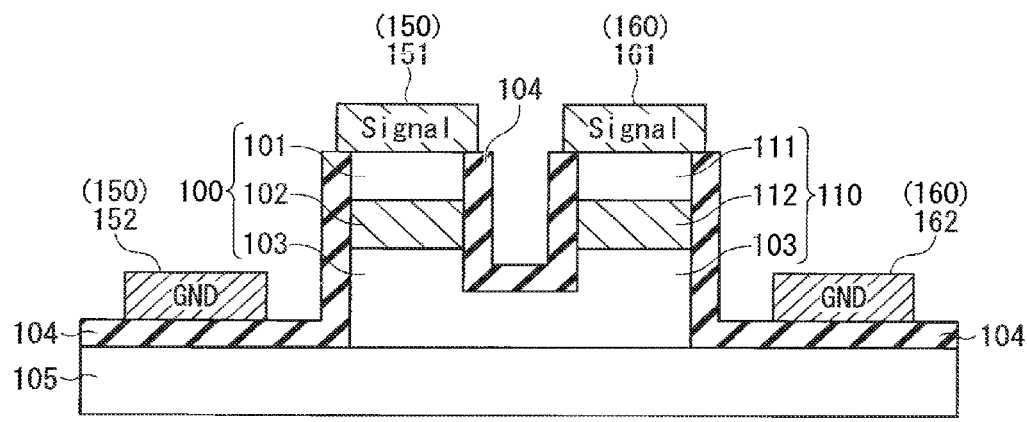
FIG. 3 is a cross-sectional view taken along line B-B' in FIG. 1.

The light propagating through the optical waveguide arm 100 and the optical waveguide arm 110 is modulated in accordance with the electric signals, in between end surface B-B' and end surface C-C' illustrated in FIG. 1. FIG. 3 is a cross-sectional view taken along line B-B' in FIG. 1; that is FIG. 3 is a cross-sectional view of a structure in the end surface B-B'. As illustrated in FIG. 3, the optical waveguide arm 100 and the optical waveguide arm 110 are respectively connected to the signal electrode 150 and the signal electrode 160, only in between the end surface B-B' and the end surface C-C'. Then, the optical modulator varies the refractive indexes of the multi-quantum wells within the active layer 102 and active layer 112 in accordance with the electric signals to thus vary a phase of the light. The cross-sectional view of the structure in between the end surface B-B' and the end surface C-C' is the same as the cross-sectional view of the structure in FIG. 3.

In particular, the light propagating through the optical waveguide arm 100 and the optical waveguide arm 110 has the same phase in the end surface B-B' prior to the modulation. The light is then controlled to have opposite phases in the end surface C-C' after the modulation. At this time, the light in the optical waveguide arm 100 has phases (0 and π) in the end surface C-C'; and the light in the optical waveguide arm 110, phases (π and 0).

Additionally, the optical phase π shifter 140 π-reverses the phase of the light propagating through the optical waveguide arm 100. Then, the optical multiplexer 130 combines the light propagating through the respective optical waveguide arms 100 and 110 together, so that the light modulated to have the phases (0 and π) is emitted from the outgoing terminal 180. In this way, the electric signals appear as phases of the light emitted from the MZM, and thus electricity is converted into light.

In the absence of a amplitude difference between the electric signals input to the respective optical waveguide arm 100 and optical waveguide arm 110, i.e., the electric signals in the end surface B-B', the light propagating trough the optical waveguide arm 100 and the optical waveguide arm 110 have opposite phases (phase shift π) in the end surface C-C' after the modulation. On the other hand, in the presence of the amplitude difference between the electric signals, a phase shift of light is π−δ, where δ is a positive, and thus the light does not have opposite phases. As a result, the optical multiplexer 130 cannot combine the continuous wave light in the same phases. This reduces an output of the emitted light by a phase shift of δ of light.

Figure 4:
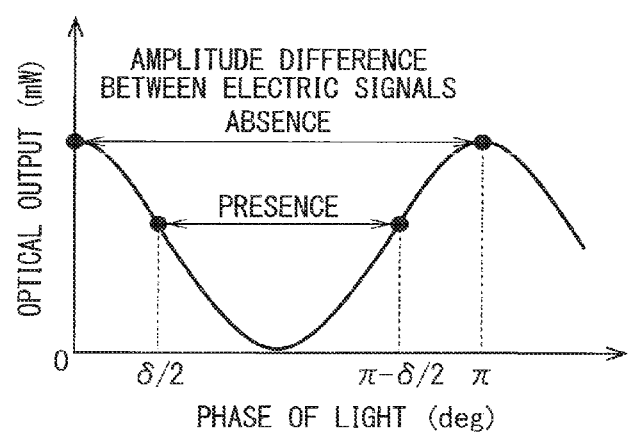
FIG. 4 is a graph showing a relationship between an output of emitted light and a phase.

FIG. 4 is a graph showing a relationship between an output of the emitted light and a phase. As illustrated in FIG. 4, in the absence of the amplitude difference between the electric signals, the emitted light has a maximum output in the phases (0 and π). On the other hand, in the presence of the amplitude difference between the electric signals, the phase shift of light in the end surface C-C' in FIG. 1 is π−δ. Thus, the emitted light has phases (δ/2 and π−δ/2). Consequently, the outputs of the light are reduced. Additionally, the reduction of the output of the light is accompanied by a reduction of an extinction ratio. Further, a smaller variation of an optical output than a variation of a phase of light is under less noise influence, and thus the least noise influence is in the phases of light (0 and π) as seen from FIG. 4. Hence, in the presence of the amplitude difference between the electric signals, the noise is under large influence. As described above, it is important to reduce the amplitude difference between the electric signals input to the optical waveguide arm 100 and the optical waveguide arm 110, i.e., between the electric signals in the end surface B-B' illustrated in FIG. 1, in terms of (1) the optical output, (2) the extinction ratio, and (3) noise immunity.

However, as illustrated in FIG. 1, different optical waveguide arms have different electrode patterns before the electric signals enter the optical waveguide arm 100 and the optical waveguide arm 110 from input ends of the signal electrode 150 and the signal electrode 160, due to a limited chip-layout of an element. This causes the amplitude difference between the electric signal input to the respective optical waveguide arms 100 and 110.

Accordingly, as illustrated in FIG. 1, a value of the junction capacitance 190 connected in shunt to a portion of the signal electrode 160, to which the electric signal is input, is varied (regulated) in accordance with the magnitude of the DC voltage supplied from the DC voltage source 200, so that the amplitude of the electric signal input to the optical waveguide arm 110 is regulated.

Figure 5:
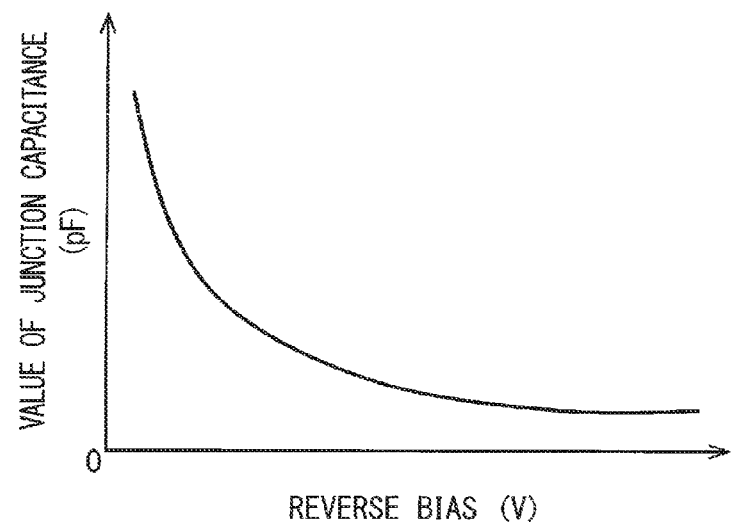
FIG. 5 is a graph showing a relationship between a value of a junction capacitance and a reverse bias.

FIG. 5 is a graph showing a relationship between the value of the junction capacitance 190 and a reverse bias. As illustrated in FIG. 5, the value of the junction capacitance 190 varies non-linearly with respect to the reverse bias. Hence, the amplitude of the electric signal input to the optical waveguide arm 110 is regulated in accordance with the value of the DC voltage supplied from the DC voltage source 200 to thus reduce the amplitude difference between the electric signals input to the respective optical waveguide arms 100 and 110.

Figure 6:
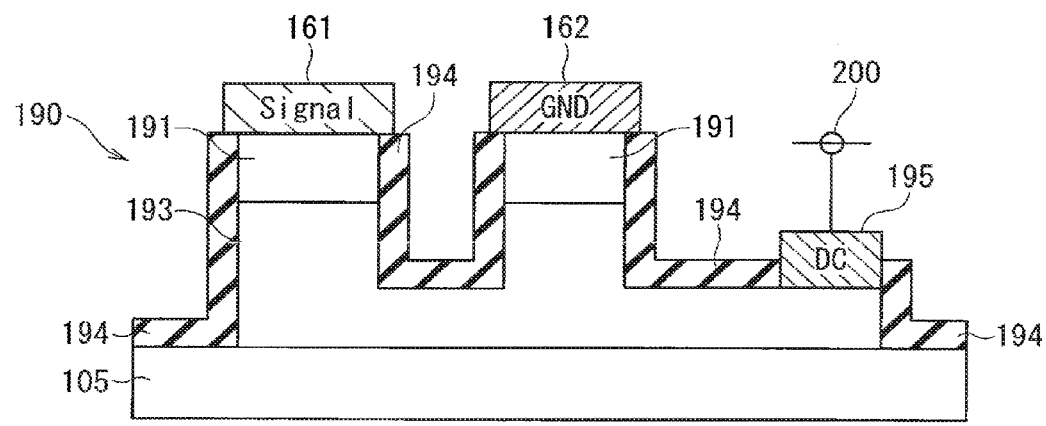
FIG. 6 is a cross-sectional view of a junction capacitance.

The following describes a structure of the junction capacitance 190. FIG. 6 is across-sectional view of the junction capacitance 190. As illustrated in FIG. 6, the junction capacitance 190 includes the semi-insulating substrate 105, a p-semiconductor layer 191, an n-semiconductor layer 193, an insulating film 194, and a DC electrode 195. The junction capacitance 190 includes a p-n junction between the p-semiconductor layer 191 and the n-semiconductor layer 193.

The following describes an operation of the junction capacitance 190. The DC voltage source 200 reverse-biases the junction capacitance 190 to thus change a depletion layer region of a p-n junction interface. Consequently, the value of the junction capacitance 190 is varied (regulated). As a result, the value of the junction capacitance 190 is, regulated in accordance with the magnitude of the voltage supplied from the DC voltage source 200. This reduces the amplitude difference between the electric signals input to the optical waveguide arm 100 and the optical waveguide arm 110, i.e., the electric signals in the end surface B-B' illustrated in FIG. 1.

Figure 7:
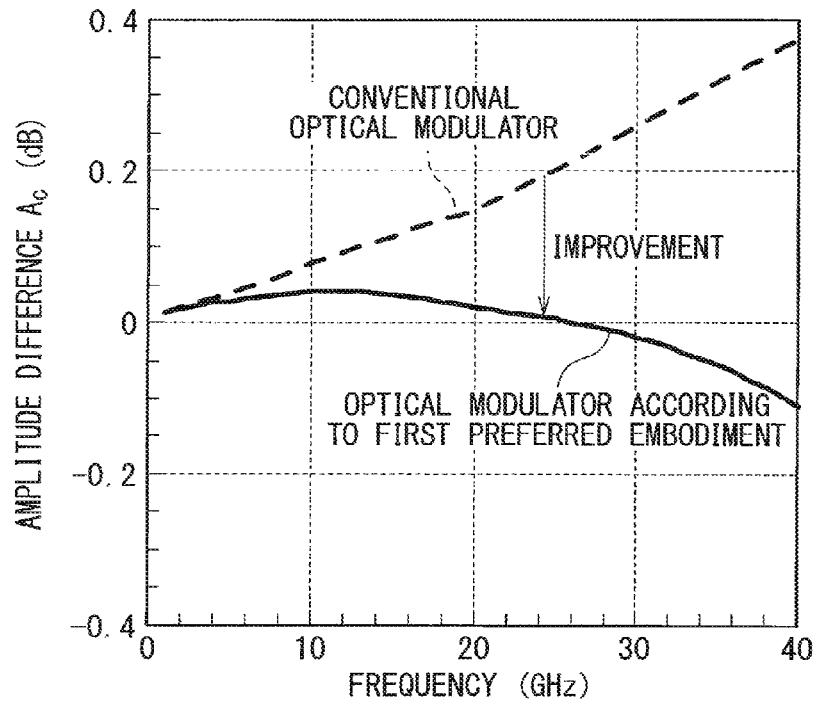
FIG. 7 is a graph showing a relationship between an amplitude difference $A_C$ between electric signals that are input to two optical waveguide arms, and a frequency.

FIG. 7 is a graph showing a relationship between an amplitude difference $A_C$ between the electric signals, which are input to the optical waveguide arm 100 and the optical waveguide arm 110, and a frequency. Here, the amplitude difference $A_C$ is defined as an amplitude value $A_{110}$ (amplitude value of the electric signal input to the optical waveguide arm 110)—an amplitude value $A_{100}$ (amplitude value of the electric signal input to the optical waveguide arm 100). In FIG. 7, the solid line denotes the amplitude difference $A_C$ in the optical modulator according to the first preferred embodiment; and the dotted line denotes the amplitude difference $A_C$ in a conventional optical modulator.

As illustrated in FIG. 7, the conventional optical modulator satisfies $A_{110} > A_{100}$. Thus, the optical modulator according to the first preferred embodiment regulates the amount of losses of the electric signals using the junction capacitance 190 connected in shunt to the signal electrode 160. As a result, the graph reveals that optimally setting the value of the voltage supplied from the DC voltage source 200 improves the amplitude difference between the electric signals input to the respective optical waveguide arm 100 and optical waveguide arm 110, in the optical modulator according to the first preferred embodiment.

Figure 8:
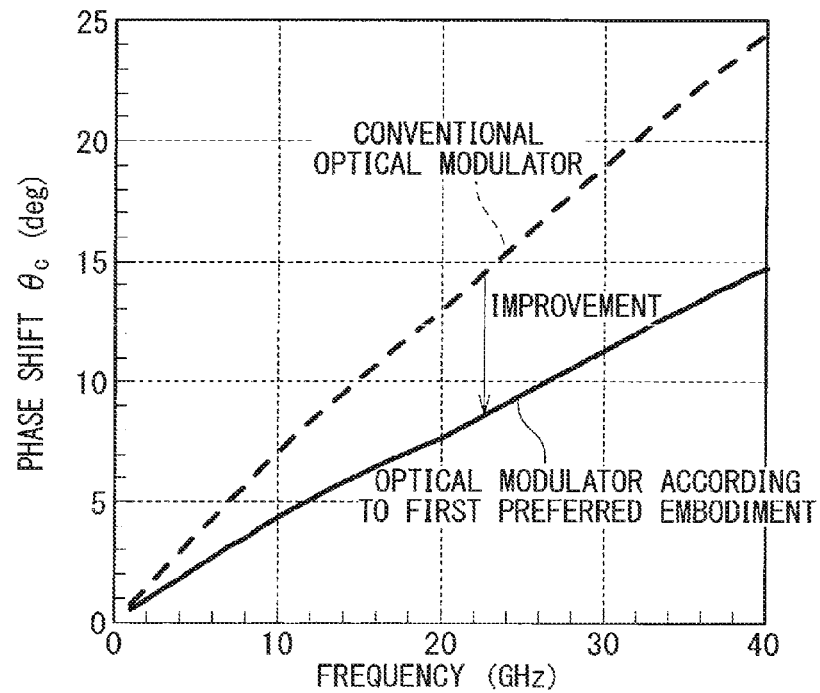
FIG. 8 is a graph showing a relationship between a phase shift $\theta_C$ between the electric signals, which are input to the two optical waveguide arms, and a frequency.

FIG. 8 is a graph showing a relationship between a phase shift $\theta_C$ between the electric signals, which are input to the optical waveguide arm 100 and the optical waveguide arm 110, and a frequency. Here, the phase shift $\theta_C$ is defined as a phase $\theta_{110}$ (phase of the electric signal input to the optical waveguide arm 110)–a phase $\theta_{100}$ (phase of the electric signal input to the optical waveguide arm 100). In FIG. 8, the solid line denotes the phase shift $\theta_C$ in the optical modulator according to the first preferred embodiment, and the dotted line denotes the phase shift $\theta_C$ in the conventional optical modulator.

As illustrated in FIG. 8, when $A_{110} > A_{100}$ and $\theta_{110} > \theta_{100}$ are satisfied, the junction capacitance 190 connected in shunt to the signal electrode 160 delays the phase $\theta_{110}$. As a result, the graph reveals that this delay improves the phase shift between the electric signals input to the optical waveguide arm 100 and the optical waveguide arm 110, in the optical modulator according to the first preferred embodiment when compared with the conventional optical modulator.

Adjusting an electrical length in a module substrate on which the MZM element is disposed facilitates a reduction in the phase shift $\theta_C$ between the electric signals. However, reducing the phase shift $\theta_C$ between elements in advance reduces the amount of adjustment of the electrical length in the module substrate. This achieves a small module substrate.

The junction capacitance 190 is used to regulate the amplitudes of the electric signals. Accordingly, a reverse current is small while the junction capacitance 190 is reverse-biased. This minimizes an increase in power consumption.

As described above, the optical modulator according to the first preferred embodiment is configured such that the DC voltage source 200 applies the DC voltage to the junction capacitance 190 to regulate the value of the junction capacitance 190 so as to regulate the amplitude value of the electric signal input to the optical waveguide arm 110. Such a configuration reduces, using a simple configuration, the amplitude difference between the electric signals input to the respective optical waveguide arm 100 and optical waveguide arm 110. Additionally, the junction capacitance 190 is used to regulate the amplitudes of the electric signals. Accordingly, the reverse current is small while the junction capacitance 190 is reverse-biased. This minimizes the increase in power consumption.

The junction capacitance 190 includes the p-n junction between the p-semiconductor layer 191 and the n-semiconductor layer 193. Additionally, the junction capacitance 190 is reverse-biased to thus regulate the value of the junction capacitance 190. This reduces the amplitude difference between the electric signals input to the optical waveguide arm 100 and the optical waveguide arm 110.

Figure 9:
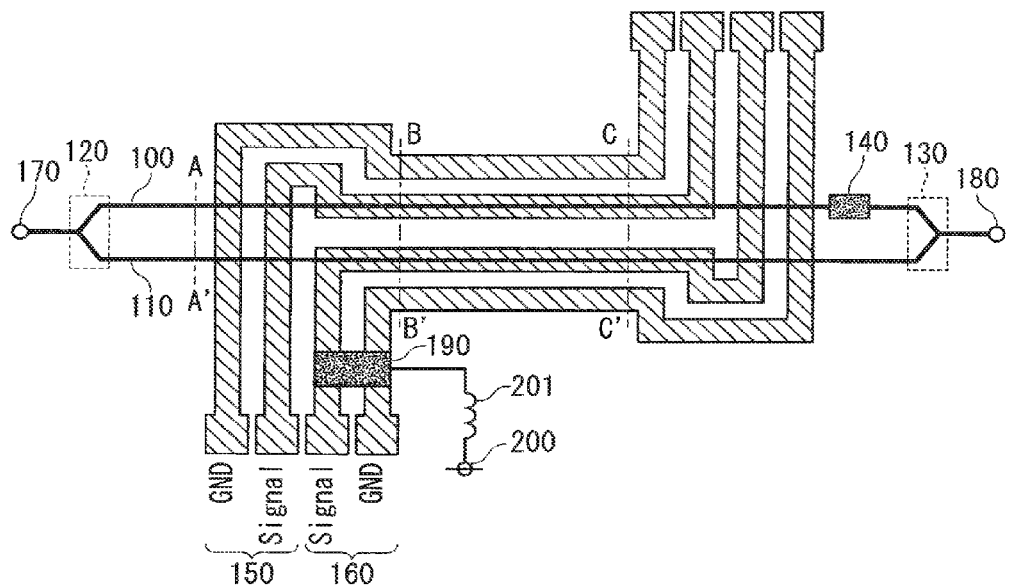
FIG. 9 is a diagram of another configuration of the optical modulator according to the first preferred embodiment.

The following describes another configuration of the optical modulator according to the first preferred embodiment. FIG. 9 is a diagram of the other configuration of the optical modulator according to the first preferred embodiment. As illustrated in FIG. 9, a circuit component having an open-circuit impedance in a high frequency is disposed between the junction capacitance 190 and the DC voltage source 200. More specifically, the circuit component, i.e., an inductor 201 is connected in series between the junction capacitance 190 and the DC voltage source 200. Consequently, the DC voltage source 200 has an open-circuit impedance in a high frequency. Thus, a circuit of the DC voltage source 200 has small effect on high-frequency characteristics, to thus minimize degradation of the high-frequency characteristics.

Figure 10:
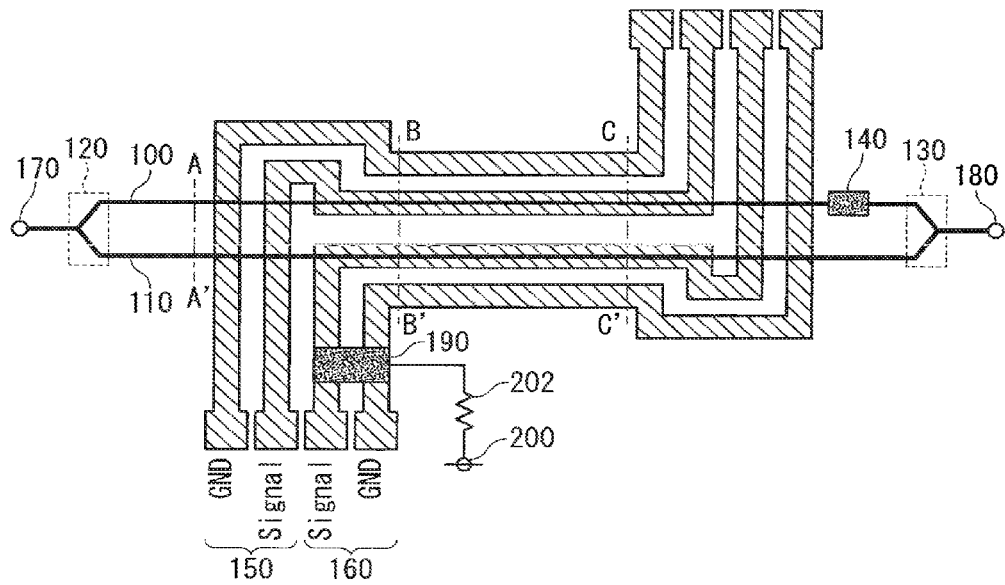
FIG. 10 is a diagram of still another configuration of the optical modulator according to the first preferred embodiment.

FIG. 10 is a diagram of still another configuration of the optical modulator according to the first preferred embodiment. As illustrated in FIG. 10, the circuit component, i.e., a high-resistance resistor 202 of 1 kΩ or more is connected in series between the junction capacitance 190 and the DC voltage source 200. Consequently, the DC voltage source 200 has the open-circuit impedance in the high frequency. Thus, the circuit of the DC voltage source 200 has small effect on the high-frequency characteristics, to thus minimize the degradation of the high-frequency characteristics. Additionally, the use of the high-resistance resistor 202 instead of the use of the inductor 201 achieves a small optical modulator module.

The circuit component, which has the open-circuit impedance in the high frequency, is disposed between the junction capacitance 190 and the DC voltage source 200. Thus, the circuit of the DC voltage source has small effect on the high-frequency characteristics, to thus minimize the degradation of the high-frequency characteristics.

The following describes another configuration of the junction capacitance 190. FIG. 11 is a cross-sectional view of the other configuration of the junction capacitance 190. As illustrated in FIG. 11, the junction capacitance 190 includes the semi-insulating substrate 105, the n-semiconductor layer 193, the insulating film 194, and the DC electrode 195. The junction capacitance 190 also includes a Schottky junction between the Signal electrode 161 and GND electrode 162, which are signal electrodes, and the n-semiconductor layer 193.

The DC voltage source 200 reverse-biases the junction capacitance 190 to thus change a depletion-layer region of a Schottky junction interface. Consequently, the value of the junction capacitance 190 is varied. As a result, the value of the junction capacitance 190 is regulated in accordance with the magnitude of the voltage supplied from the DC voltage source 200. This reduces the amplitude difference between the electric signals input to the optical waveguide arm 100 and the optical waveguide arm 110, i.e., the electric signals in the end surface B-B' illustrated in FIG. 1.

As describes above, the junction capacitance 190 includes the Schottky junction between the Signal electrode 161 and GND electrode 162, and the n-semiconductor layer 193. Additionally, the junction capacitance 190 is reverse-biased to regulate the value of the junction capacitance. This reduces the amplitude difference between the electric signals input to the optical waveguide arm 100 and the optical waveguide arm 110.

FIG. 12 is a cross-sectional view of still another configuration of the junction capacitance 190. As illustrated in FIG. 12, the junction capacitance 190 includes the semi-insulating substrate 105, the p-semiconductor layer 191, an i-active layer 192, the n-semiconductor layer 193, the insulating film 194, and the DC electrode 195. The junction capacitance 190 includes a p-i-n junction among the p-semiconductor layer 191, the i-active layer 192, and the n-semiconductor layer 193. The DC voltage source 200 reverse-biases the junction capacitance 190 to thus change a depletion layer region of a p-i-n junction interface. Consequently, the value of the junction capacitance 190 is varied. As a result, the value of the junction capacitance 190 is regulated in accordance with the magnitude of the voltage supplied from the DC voltage source 200. This reduces the amplitude difference between the electric signals input to the optical waveguide arm 100 and the optical waveguide arm 110, i.e., the electric signals in the end surface B-B' illustrated in FIG. 1.

The junction capacitance 190 includes an epitaxial structure identical to epitaxial structures of the optical waveguide arm 100 and the optical waveguide arm 110. Such a configuration minimizes an increase in number of process steps for manufacturing elements.

As described above, the junction capacitance 190 includes the p-i-n junction among the p-semiconductor layer 191, the i-active layer 192, and the n-semiconductor layer 193. Additionally, the junction capacitance 190 is reverse-biased to regulate the value of the junction capacitance 190. This reduces the amplitude difference between the electric signals input to the optical waveguide arm 100 and the optical waveguide arm 110.

The junction capacitance 190 includes the p-i-n junction among the p-semiconductor layer 191, the i-active layer 192, and the n-semiconductor layer 193. The junction capacitance 190 also includes the epitaxial structure identical to the epitaxial structures of the optical waveguide arm 100 and the optical waveguide arm 110. The junction capacitance 190 is also reverse-biased to regulate the value of the junction capacitance 190. Such a configuration minimizes an increase in number of the process steps for manufacturing the elements.

Second Preferred Embodiment

Figure 13:
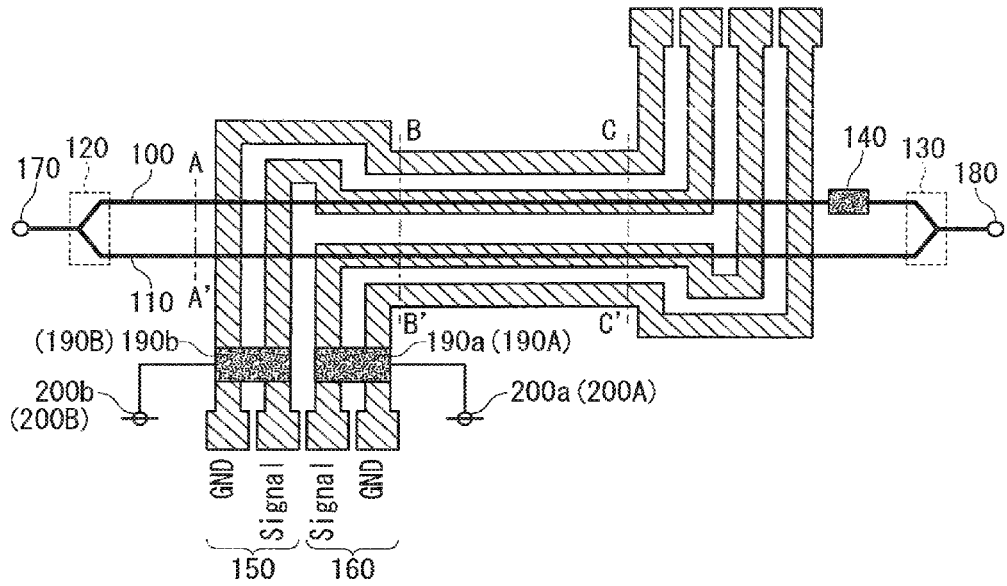
FIG. 13 is a diagram of a configuration of an optical modulator according to a second preferred embodiment.

The following describes an optical modulator according to a second preferred embodiment. FIG. 13 is a diagram of a configuration of optical modulator the according to the second preferred embodiment. Like components in the second preferred embodiment as those described in the first preferred embodiment are denoted by the same symbols. The description of the like components is thus omitted.

The optical modulator according to the first preferred embodiment includes one junction capacitance 190 and one DC voltage source 200. The optical modulator according to the second preferred embodiment includes two junction capacitances and two DC voltage sources. Specifically, as illustrated in FIG. 13, the optical modulator according to the second preferred embodiment includes a junction capacitance 190A (first junction capacitance), a junction capacitance 190B (second junction capacitance), a DC voltage source 200A (first DC voltage source), and a DC voltage source 200B (second DC voltage source). The junction capacitance 190A includes one junction capacitance 190a connected in shunt to the signal electrode 160. The junction capacitance 190B includes one junction capacitance 190b connected in shunt to the signal electrode 150. The DC voltage source 200A includes one DC voltage source 200a that applies a DC voltage to the junction capacitance 190A to regulate a value of the junction capacitance 190A. The DC voltage source 200B includes one DC voltage source 200b that applies a DC voltage to the junction capacitance 190B to regulate a value of the junction capacitance 190B.

The following describes an operation of the optical modulator according to the second preferred embodiment. The optical modulator varies a value of the junction capacitance 190a in accordance with the magnitude of the voltage supplied from the DC voltage source 200a so as to regulate the amplitude of the electric signal input to the optical waveguide arm 110. The optical modulator also varies a value of the junction capacitance 190b in accordance with the magnitude of the voltage applied from the DC voltage source 200b so as to regulate the amplitude of the electric signal input to the optical waveguide arm 100. The optical modulator according to the first preferred embodiment reduces the amplitude difference the between the electric signals input to the optical waveguide arm 100 and the optical waveguide arm 110, i.e., the amplitude difference between the electric signals in the end surface B-B', using only the junction capacitance 190 connected in shunt to the signal electrode 160 as illustrated in FIG. 1. Accordingly, provided is a single adjustment parameter of the amplitude difference between the electric signals.

In contrast to this, as illustrated in FIG. 13, the optical modulator according to the second preferred embodiment reduces the amplitude difference between the electric signals input to the optical waveguide arm 100 and the optical waveguide arm 110, i.e., the electric signals in the end surface B-B', using the junction capacitance 190a connected in shunt to the signal electrode 160 and the junction capacitance 190b connected in shunt to the signal electrode 150. Accordingly, provided are two adjustment parameters of the amplitude difference between the electric signals.

Thus, the optical modulator according to the second preferred embodiment, which has more adjustments parameters of the amplitude difference between the electric signals, enables the amplitude difference between the electric signals input to optical waveguide arm 100 and the optical waveguide arm 110, i.e., the electric signals in the end surface B-B' to be reduced, when compared with the optical modulator according to the first preferred embodiment.

As described above, the optical modulator according to the second preferred embodiment is configured such that the DC voltage source 200A applies the DC voltage to the junction capacitance 190A to regulate the value of the junction capacitance 190A, and that the DC voltage source 200B applies the DC voltage to the junction capacitance 190B to regulate the value of the junction capacitance 190B. Consequently, the values of amplitude of the electric signals input to the respective optical waveguide arm 110 and optical waveguide arm 100 are regulated. This reduces, using a simple configuration, the amplitude difference between the electric signals input to the respective optical waveguide arm 100 and optical waveguide arm 110. Additionally, the junction capacitance 190A and the junction capacitance 190B are used to regulate the amplitudes of the electric signals. Accordingly, reverse currents are small while the junction capacitance 190A and the junction capacitance 190B are reverse-biased. This minimizes an increase in power consumption.

Figure 14:
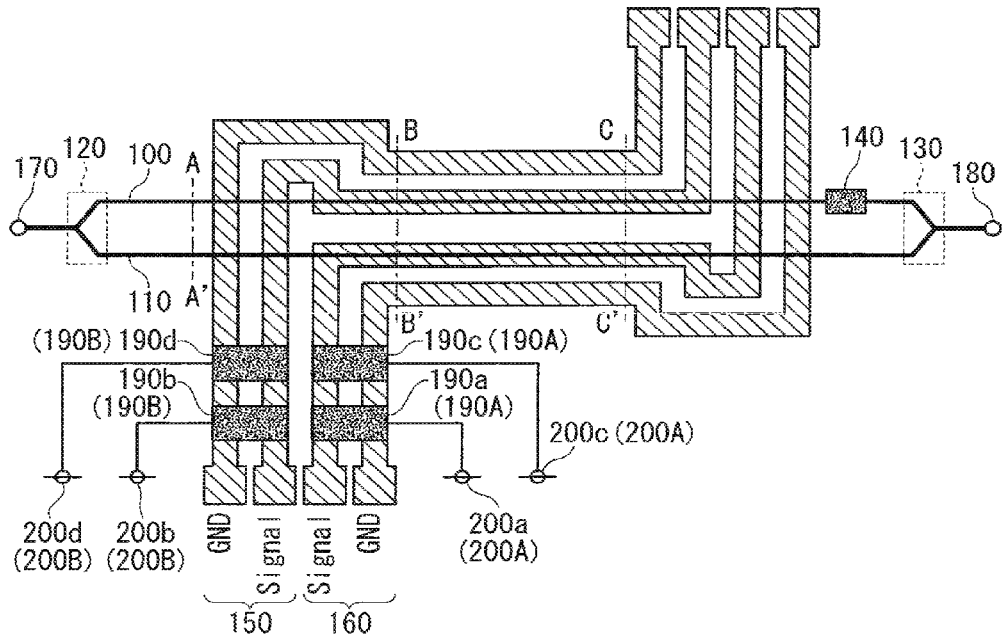
FIG. 14 is a diagram of another configuration of the optical modulator according to the second preferred embodiment.

The following describes another configuration of the optical modulator according to the second preferred embodiment. FIG. 14 is a diagram of the other configuration of the optical modulator according to the second preferred embodiment. As illustrated in FIG. 14, the junction capacitance 190A includes a plurality of (e.g., two) junction capacitances 190a and 190c each connected in shunt to the signal electrode 160. Additionally, the junction capacitance 190B includes a plurality of (e.g., two) junction capacitances 190b and 190d each connected in shunt to the signal electrode 150, as illustrated in FIG. 14. The DC voltage source 200A includes a plurality of (e.g., two) DC voltage sources 200a and 200c each regulating the value of the junction capacitance 190A. The DC voltage source 200B includes a plurality of (e.g., two) DC voltage sources 200b and 200d each regulating the value of the junction capacitance 190B As such, more adjustment parameters of the amplitude difference between the electric signals than the adjustment parameter in FIG. 13 enable the amplitude difference between the electric signals to be further reduced.

Figure 15:
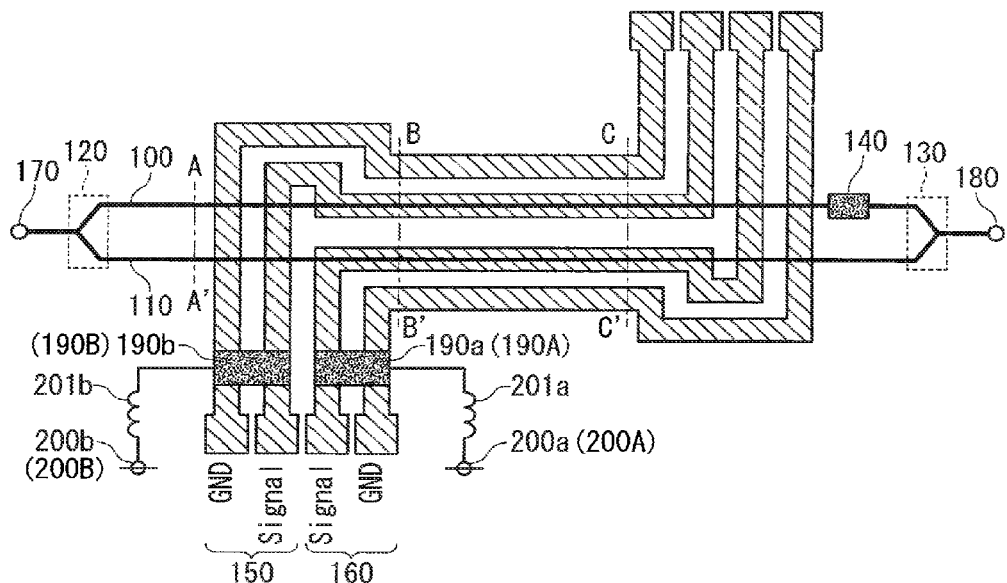
FIG. 15 is a diagram of still another configuration of the optical modulator according to the second preferred embodiment.

FIG. 15 is a diagram of still another configuration of the optical modulator according to the second preferred embodiment. As illustrated in FIG. 15, an inductor 201a is connected in series between the junction capacitance 190a and the DC voltage source 200a; and an inductor 201b, between the junction capacitance 190b and the DC voltage source 200b. The inductors 201a and 201b are circuit components each having an open-circuit impedance in a high frequency. Consequently, the DC voltage source 200a and the DC voltage source 200b have open-circuit impedances in the high frequency. Thus, circuits of the DC voltage source 200a and the DC voltage source 200b have small effect on the high-frequency characteristics to thus minimize degradation of the high-frequency characteristics.

Figure 16:
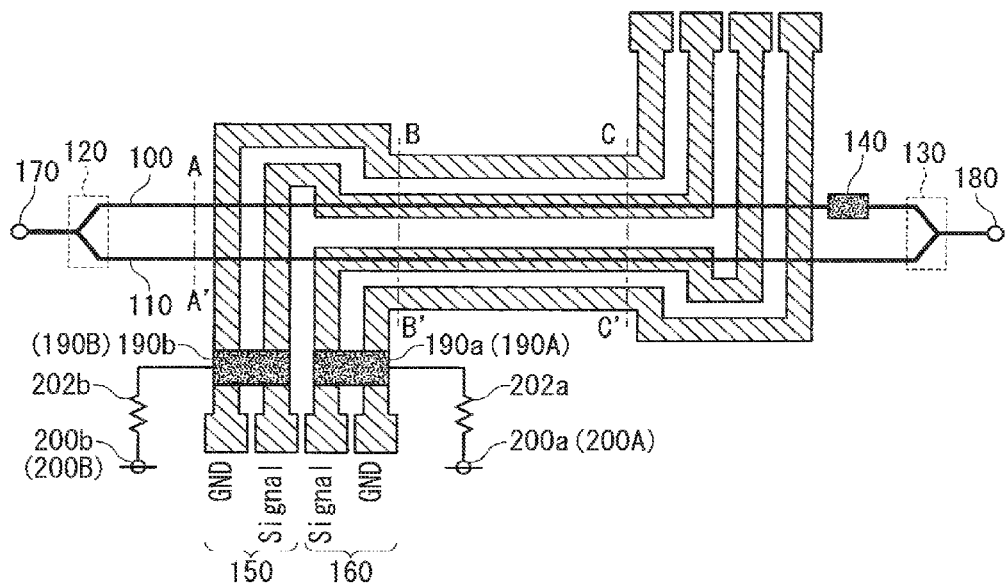
FIG. 16 is a diagram of yet another configuration of the optical modulator according to the second preferred embodiment.

FIG. 16 is a diagram yet another configuration of the optical modulator according to the second preferred embodiment. As illustrated in FIG. 16, a high-resistance resistor 202a of 1 kΩ or more is connected in series between the junction capacitance 190a and the DC voltage source 200a; and a high-resistance resistor 202b of 1 kΩ or more, between the junction capacitance 190b and the DC voltage source 200b. The high-resistance resistors 202a and 202b are circuit components each having an open-circuit impedance. Consequently, the DC voltage source 200a and the DC voltage source 200b have open-circuit impedances in the high frequency. Thus, circuits of the DC voltage source 200a and the DC voltage source 200b have small influence on the high-frequency characteristic to thus minimize the degradation of the high-frequency characteristics. Additionally, the use of the high-resistance resistor 202a and high-resistance resistor 202b instead of the use of the inductor 201a and inductor 201b achieves a small optical modulator module.

The junction capacitances 190A and 190B each have a structure similar to a corresponding structure in FIG. 6, FIG. 11, or FIG. 12 described in the first preferred embodiment. The structure in the second preferred embodiment, whose description is not provided herein, achieves an effect similar to an effect of the corresponding structure in FIG. 6, FIG. 11, or FIG. 12.

Third Preferred Embodiment

Figure 17:
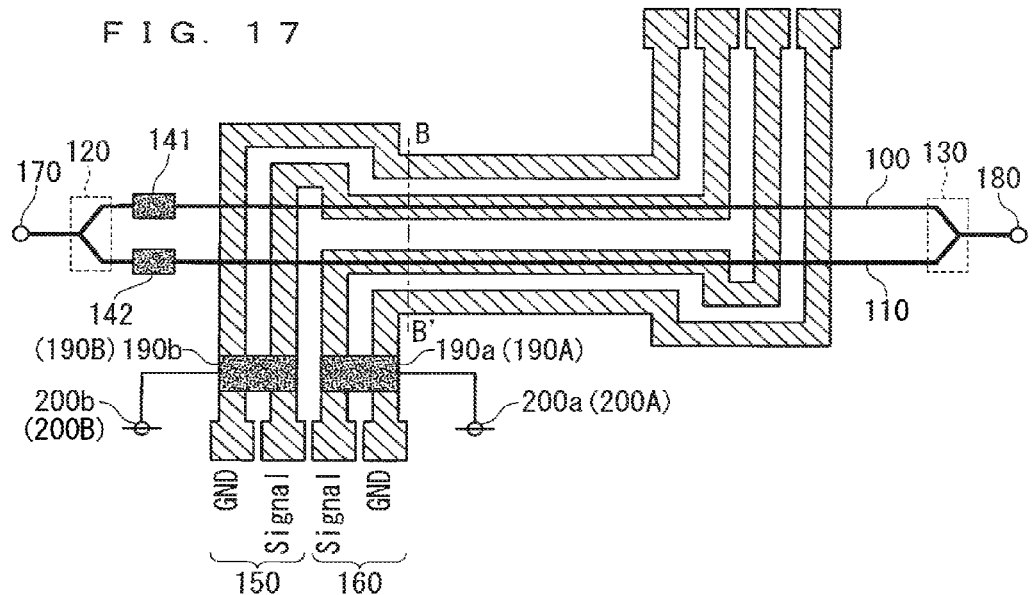
FIG. 17 is a diagram of a configuration of an optical modulator according to a third preferred embodiment.

The following describes an optical modulator according to a third preferred embodiment. FIG. 17 is a diagram of the optical modulator according to the third preferred embodiment. Like components in the third preferred embodiment as those described in the second preferred embodiment are denoted by the same symbols. The description of the like components is thus omitted.

The optical modulator according to the second preferred embodiment includes the optical phase π shifter 140 disposed in the rear stage of at least one of the optical waveguide arm 100 and the optical waveguide arm 110. In contrast, the optical modulator according to the third preferred embodiment includes an optical phase π shifter 141 and an optical phase π shifter 142 respectively disposed in a front stage of the optical waveguide arm 100 and in a front stage of the optical waveguide arm 110.

The optical modulator according to the third preferred embodiment includes, like the second preferred embodiment, two junction capacitances and two DC voltage sources. Specifically, as illustrated in FIG. 17, the optical modulator according to the third preferred embodiment includes the junction capacitance 190A (first junction capacitance), the junction capacitance 190B (second junction capacitance), the DC voltage source 200A (first DC voltage source), and the DC voltage source 200B (second DC voltage source). The junction capacitance 190A includes one junction capacitance 190a connected in shunt to the signal electrode 160. The junction capacitance 190B includes one junction capacitance 190b connected in shunt to the signal electrode 150. The DC voltage source 200A includes one DC voltage 200a that applies a DC voltage to the junction capacitance 190A to thus regulate the value of the junction capacitance 190A. The DC voltage source 200B includes one DC voltage source 200b that applies a DC voltage to the junction capacitance 190B to thus regulate the value of the junction capacitance 190B.

The following describes an operation of the optical modulator according to the third preferred embodiment. The optical modulator varies the value of the junction capacitance 190a in accordance with the magnitude of the voltage supplied from the DC voltage source 200a so as to regulate the amplitude of the electric signal input to the optical waveguide arm 110. The optical modulator also varies the value of the junction capacitance 190b in accordance with the magnitude of the voltage supplied from the DC voltage source 200b so as to regulate the amplitude of the electric signal input to the optical waveguide arm 100. The optical modulator according to the first preferred embodiment reduces the amplitude difference the between the electric signals input to the optical waveguide arm 100 and the optical waveguide arm 110, i.e., amplitude difference between the electric signals in the end surface B-B', using only the junction capacitance 190 connected in shunt to the signal electrode 160, as illustrated in FIG. 1. Accordingly, provided is a single adjustment parameter of the amplitude difference between the electric signals.

In contrast to this, as illustrated in FIG. 17, the optical modulator according to the third preferred embodiment reduces the amplitude difference between the electric signals input to the optical waveguide arm 100 and the optical waveguide arm 110, i.e., the amplitude difference between the electric signals in the end surface B-B', using the junction capacitance 190a connected in shunt to the signal electrode 160 and the junction capacitance 190b connected in shunt to the signal electrode 150. Accordingly, provided are two adjustment parameters of the amplitude difference between the electric signals.

Thus, the optical modulator according to the third preferred embodiment, which has more adjustment parameters of the amplitude difference between the electric signals, enables the amplitude difference between the electric signals input to optical waveguide arm 100 and the optical waveguide arm 110, i.e., the amplitude difference between the electric signals in the end surface B-B' to be reduced, when compared with the optical modulator according to the first preferred embodiment.

As described above, the optical modulator according to the third preferred embodiment is configured such that the DC voltage source 200A applies the DC voltage to the junction capacitance 190A to regulate the value of the junction capacitance 190A, and that the DC voltage source 200B applies the DC voltage to the junction capacitance 190B to regulate the value of the junction capacitance 190B. Consequently, the amplitude values of the electric signals input to the respective optical waveguide arm 110 and the optical waveguide arm 100 are regulated. This reduces, using a simple configuration, the amplitude difference between the electric signals input to the respective optical waveguide arm 100 and optical waveguide arm 110. Additionally, the junction capacitance 190A and the junction capacitance 190B are used to regulate the amplitudes of the electric signals. Accordingly, the reverse currents are small while the junction capacitance 190A and the junction capacitance 190B are reverse-biased. This minimizes an increase in power consumption.

The following describes an example of how to adjust the DC voltage applied to the junction capacitance. Here, the DC voltage is adjusted to reflect, in addition to the amplitude difference between the electric signals, existing in the elements, an amplitude difference between the electric signals due to variations in manufacturing the optical modulator when the optical modulator is mounted as an optical transmission module. It is difficult to monitor the amplitude differences between the electric signals after the optical modulator is mounted as the optical transmission module. In this case, receiving an optical output as modulated, and then applying, to the junction capacitance, a DC voltage at which a phase-modulated signal has an optimal constellation or a DC voltage which has the best bit-error rate during transmission enables the adjustment.

The junction capacitance 190A and the junction capacitance 190B have a structure similar to the corresponding structure in FIG. 6, FIG. 11, or FIG. 12 described in the first preferred embodiment. The structure in the third preferred embodiment, whose description is not provided herein, achieves an effect similar to the effect of the corresponding structure in FIG. 6, FIG. 11, or FIG. 12.

In the third preferred embodiment, only one of the first and second junction capacitances can be used, like the first preferred embodiment.

Figure 18:
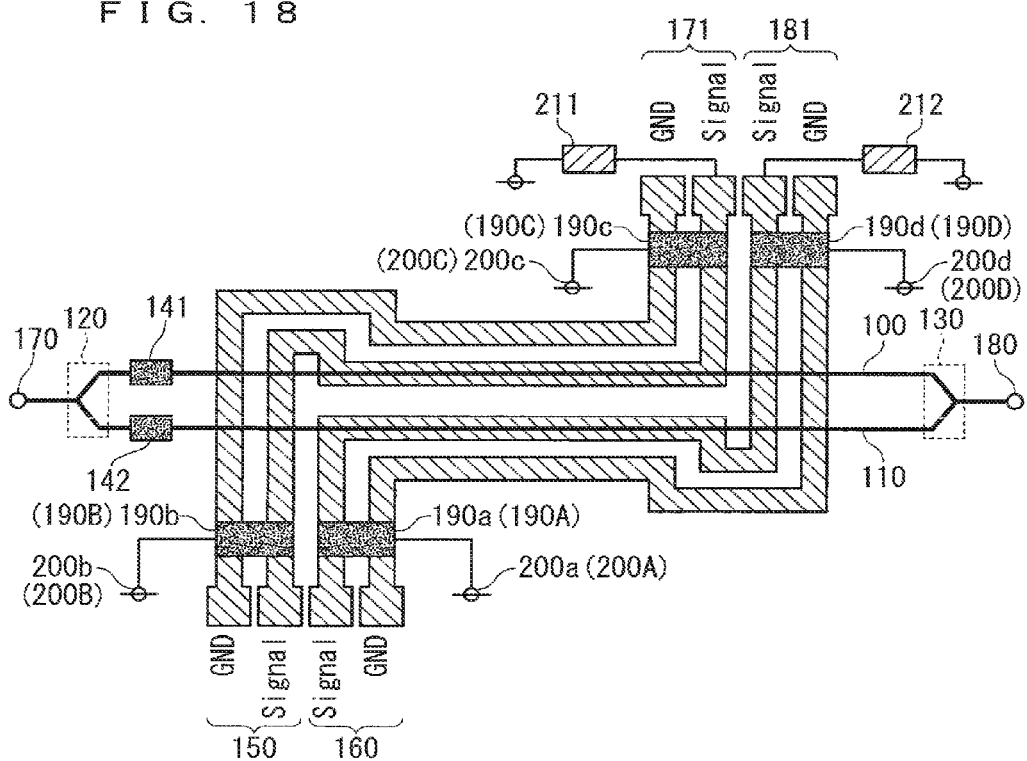
FIG. 18 is a diagram of another con figuration of the optical modulator according to the third preferred embodiment.

The following describes another configuration of the optical modulator according to the third preferred embodiment. FIG. 18 is a diagram of the other configuration of the optical modulator according to the third preferred embodiment (hereinafter referred to as a "second configuration").

The optical modulator according to the third preferred embodiment, illustrated in FIG. 17 (hereinafter referred to as a "first configuration") includes: the junction capacitance 190A (first junction capacitance) and the DC voltage source 200A (first DC voltage source) each disposed in a portion of the signal electrode 160, to which the electric signal is input; and the junction capacitance 190B (second junction capacitance) and the DC voltage source 200B (second DC voltage source) each disposed in a portion of the signal electrode 150, to which the electric signal is input.

The second configuration includes: in addition to the first configuration, a junction capacitance 190D (third junction capacitance) and a DC voltage source 200D (third DC voltage source) each disposed in a signal electrode 181 that is a termination side of the signal electrode 160; and a junction capacitance 190C (fourth junction capacitance) and a DC voltage source 200C (fourth DC voltage source) each disposed in a signal electrode 171 that is a termination side of the signal electrode 150.

Specifically, as illustrated in FIG. 18, the second configuration includes: the junction capacitance 190C including one junction capacitance 190c connected in shunt to the signal electrode 171 (fourth signal electrode); and the junction capacitance 190D including one junction capacitance 190d connected in shunt to the signal electrode 181 (third signal electrode). Additionally, the second configuration includes: the DC voltage source 200C including one DC voltage source 200c that applies a DC voltage to the junction capacitance 190C to thus regulate the value of the junction capacitance 190C; and the DC voltage source 200D including one DC voltage source 200d that applies a DC voltage to the junction capacitance 190D to thus regulate the value of the junction capacitance 190D. The signal electrode 171 and the signal electrode 181 respectively input electric signals to the optical waveguide arm 100 and the optical waveguide arm 110.

The following describes an operation of the optical modulator in the second configuration. In the first configuration illustrated in FIG. 17, the optical modulator varies the value of the junction capacitance 190a in accordance with the magnitude of the voltage supplied from the DC voltage source 200a so as to regulate the amplitude of the electric signal input to the optical rave arm 110. The optical modulator also varies the value of the junction capacitance 190b in accordance with the magnitude of the voltage supplied from the DC voltage source 200b so as to regulate the amplitude of the electric signal input to the optical waveguide arm 100.

As illustrated in FIG. 17, the optical modulator in the first configuration reduces the amplitude difference between the electric signals input to the optical waveguide arm 100 and the optical waveguide arm 110, i.e., the amplitude difference between the electric signals in the end surface B-B', using the junction capacitance 190a connected in shut to the signal electrode 160 and the junction capacitance 190b connected in shunt to the signal electrode 150.

As illustrated in FIG. 18, the second configuration provides, for description, a termination resistor 211 and a termination resistor 212, in addition to the junction capacitance 190C and junction capacitance 190D respectively disposed in the termination side of the signal electrode 150 and the termination side of signal electrode 160, i.e., the junction capacitance 190C and the junction capacitance 190D respectively disposed in the signal electrode 171 and the signal electrode 181. Each termination resistor typically has a resistance of 50 Ω. The other preferred embodiments actually include the termination resistor 211 and the termination resistor 212. However, the drawings excluding FIG. 18 do not provide the termination resistors because placing these termination resistors on high-frequency signal lines are publicly known.

As illustrated in FIG. 17, in the first configuration, the signal electrode 150 has a different pattern of signal lines from the signal electrode 160, from portions in which the respective patterns of signal lines are disposed on the optical waveguide arm 100 and the optical waveguide arm 110 to the termination sides of the signal electrode 150 and signal electrode 160. Hence, the Signal electrode of the signal electrode 150 and the Signal electrode of the signal electrode 160 have different impedances from each other, when the termination resistors are viewed from the signal electrode 150 and the signal electrode 160. As a result, the Signal electrode of the signal electrode 150 and the Signal electrode of the signal electrode 160 have different high-frequency properties from each other, to thus result in unbalanced high-frequency characteristics.

As illustrated in FIG. 18, the second configuration includes the junction capacitance 190C disposed at the termination side of the signal electrode 150, and junction capacitance 190D disposed at the termination side of the signal electrode 160. Such a configuration enables the DC voltages to be applied to thus regulate the impedances so as to reduce a difference between the magnitudes of the impedances when the termination resistors are viewed from the signal electrode 150 and the signal electrode 160. This reduces a difference between high-frequency characteristics of the Signal electrode of the signal electrode 150 and high-frequency characteristics of the Signal electrode of the signal electrode 160.

The junction capacitance 190C and the junction capacitance 190D have a structure similar to the corresponding structure in FIG. 6, FIG. 11, or FIG. 12 described in the first preferred embodiment. The structure in the second configuration described in the third preferred embodiment, whose description is not provided herein, achieves an effect similar to the effect of the corresponding structure in FIG. 6, FIG. 11, or FIG. 12.

Figure 19:
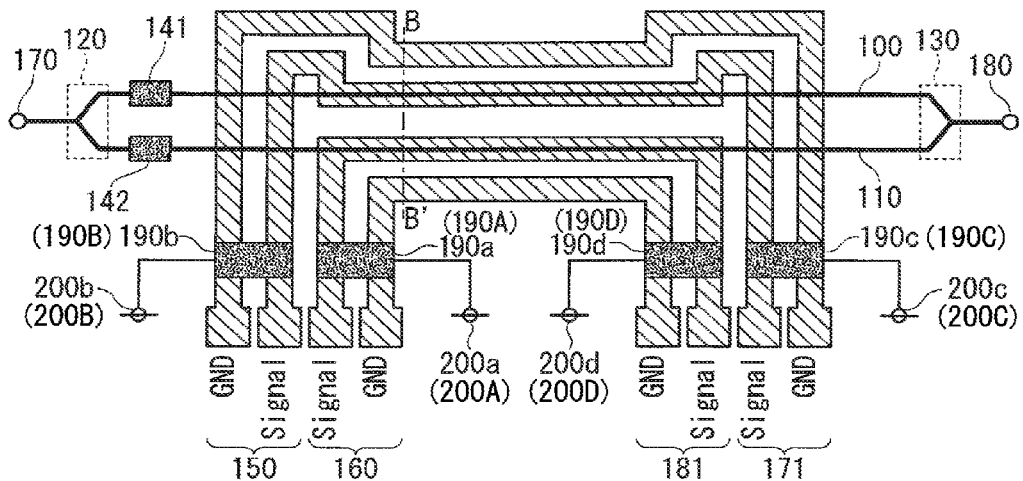
FIG. 19 is a diagram of still another configuration of the optical modulator according to the third preferred embodiment.
Figure 20:
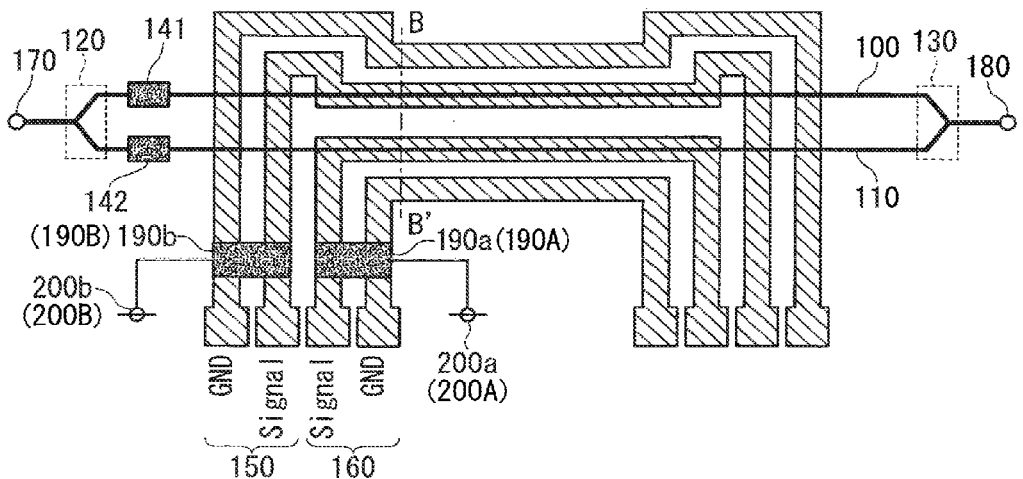
FIG. 20 is a diagram of yet another configuration of the optical modulator according to the third preferred embodiment.

As illustrated in FIG. 19, the signal electrode 150 and signal electrode 160, and the signal electrode 171 and signal electrode 181 may be disposed on sides of the optical waveguide arm 100 and the optical waveguide arm 110, identical to each other. FIG. 19 is a diagram of still another configuration of the optical modulator according to the third preferred embodiment. The still other configuration achieves an effect similar to the effect of the second configuration illustrated in FIG. 18. In some embodiments, the junction capacitances are not disposed at the termination sides of the signal electrode 150 and the signal electrode 160, as illustrated in FIG. 20. In such a case, the signal electrode 150 and the signal electrode 160, and the termination side of the signal electrode 150 and the termination side of the signal electrode 160 may be disposed on sides of the optical waveguide arm 100 and the optical waveguide arm 110, identical to each other. FIG. 20 is yet another configuration of the optical modulator according to the third preferred embodiment. The yet other configuration achieves an effect similar to the effect of the configuration illustrated in FIG. 19.

It is to be noted that in the present invention, the individual preferred embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. An optical modulator configured to vary refractive indexes of multi-quantum wells of first and second optical waveguide arms using electric signals so as to phase-modulate continuous wave light received from a semiconductor laser, said optical modulator being a Mach-Zehnder modulator, said optical modulator comprising:
   an optical demultiplexer configured to split said continuous wave light as received;
   said first and second optical waveguide arms through which said continuous wave light as split propagates;
   an optical phase shifter disposed on at least one of said first and second optical waveguide arms, said optical phase shifter being configured to introduce a phase shift of π to said continuous wave light as split;
   an optical multiplexer disposed in rear stages of said first and second optical waveguide arms, said optical multiplexer being configured to combine said continuous wave light propagating through said first and second optical waveguide arms;
   first and second signal electrodes configured to respectively input said electric signals to said first and second optical waveguide arms;
   a junction capacitance connected in shunt to at least one of said first and second signal electrodes; and
   a DC voltage source configured to apply a DC voltage to said junction capacitance.

2. The optical modulator according to claim 1, further comprising:
   third and fourth signal electrodes configured to respectively terminate said electric signals that are input to said first and second optical waveguide arms;
   third and fourth junction capacitances respectively connected in shunt to said third and fourth signal electrodes; and
   DC voltage sources configured to apply DC voltages to said third and fourth junction capacitances.

3. The optical modulator according to claim 1,
   wherein said optical phase shifter is disposed at a termination side on one of said first and second optical waveguide arms,
   wherein said junction capacitance is connected in shunt to said first signal electrode, and
   wherein said DC voltage source is configured to apply said DC voltage to said junction capacitance to regulate a value of said junction capacitance so as to regulate an amplitude value of said electric signal that is input to said first optical waveguide arm.

4. The optical modulator according to claim 1,
   wherein said optical phase shifter is disposed at a termination side on one of said first and second optical waveguide arms,
   wherein said junction capacitance has first and second junction capacitances respectively connected in shunt to said first and second signal electrodes,
   wherein said DC voltage source has first and second DC voltage sources configured to respectively apply DC voltages to said first and second junction capacitances, and
   wherein said first and second DC voltage sources are configured to respectively apply DC voltages to said first and second junction capacitances to regulate values of said first and second junction capacitances so as to regulate an amplitude value of said electric signal that is input to said first optical waveguide arm and an amplitude value of said electric signal that is input to said second optical waveguide arm.

5. The optical modulator according to claim 1, wherein a circuit component with an open-circuit impedance in a high frequency is disposed between said junction capacitance and said DC voltage source.

6. The optical modulator according to claim 4,
   wherein a circuit component with an open-circuit impedance in a high frequency is disposed between said first junction capacitance and said first DC voltage source, and
   wherein a circuit component with an open-circuit impedance in a high frequency is disposed between said second junction capacitance and said second DC voltage source.

7. The optical modulator according to claim 1,
   wherein said junction capacitance includes a p-n junction between a p-semiconductor layer and an n-semiconductor layer, and
   wherein said junction capacitance is reverse-biased to regulate a value of said junction capacitance.

8. The optical modulator according to claim 4,
   wherein said first and second junction capacitances each include a p-n junction between a p-semiconductor layer and an n-semiconductor layer, and
   wherein said first and second junction capacitances are reverse-biased to regulate values of said first and second junction capacitances.

9. The optical modulator according to claim 1,
   wherein said junction capacitance includes a Schottky junction between said signal electrode and an n-semiconductor layer, and
   wherein said junction capacitance is reverse-biased to regulate a value of said junction capacitance.

10. The optical modulator according to claim 4,
    wherein said first junction capacitance includes a Schottky junction between said first signal electrode and an n-semiconductor layer,
    wherein said second junction capacitance includes a Schottky junction between said second signal electrode and an n-semiconductor layer, and
    wherein said first and second junction capacitances are reverse-biased to regulate values of said first and second junction capacitances.

11. The optical modulator according to claim 1,
    wherein said junction capacitance includes a p-i-n junction among a p-semiconductor layer, an i-active layer, and an n-semiconductor layer, and
    wherein said junction capacitance is reverse-biased to regulate a value of said junction capacitance.

12. The optical modulator according to claim 4,
wherein said first and second junction capacitances each include a p-i-n junction among a p-semiconductor layer, an i-active layer, and an n-semiconductor layer, and
wherein said first and second junction capacitances are reverse-biased to regulate values of said first and second junction capacitances.

13. The optical modulator according to claim 1,
wherein said junction capacitance includes a p-i-n junction among a p-semiconductor layer, an i-active layer, and an n-semiconductor layer, and said junction capacitance includes an epitaxial structure identical to epitaxial structures of said first and second optical waveguide arms, and
wherein said junction capacitance is reverse-biased to regulate a value of said junction capacitance.

14. The optical modulator according to claim 4,
wherein said first and second junction capacitances each include a p-i-n junction among a p-semiconductor layer, an i-active layer, and an n-semiconductor layer, and said first and second junction capacitances each include an epitaxial structure identical to epitaxial structures of said first and second optical waveguide arms, and
wherein said first and second junction capacitances are reverse-biased to regulate values of said first and second junction capacitances.

15. The optical modulator according to claim 2, wherein said first and second signal electrodes, and said third and fourth signal electrodes are disposed on sides of said first and second optical waveguide arms, identical to each other.

16. The optical modulator according to claim 1, wherein said first and second signal electrodes, and a termination side of said first signal electrode and a termination side of said second signal electrode are disposed on sides of said first and second optical waveguide arms, identical to each other.

* * * * *